May 6, 1941. J. A. MacLEAN Re. 21,792

FLOOR CLIP AND THE METHOD OF MAKING SAME

Original Filed Feb. 9, 1931

Inventor:
John A. MacLean, deceased
By MacLean-Fogg Lock Nut
Company, Assignee
By McCaleb & Hendt
Attys.

Reissued May 6, 1941

Re. 21,792

UNITED STATES PATENT OFFICE 21,792

FLOOR CLIP AND THE METHOD OF MAKING SAME

John A. MacLean, deceased, late of Chicago, Ill., by MacLean-Fogg Lock Nut Company, assignee, Chicago, Ill.

Original No. 1,922,814, dated August 15, 1933, Serial No. 514,478, February 9, 1931. Application for reissue and division December 16, 1940, Serial No. 370,428

18 Claims. (Cl. 29—148)

The invention relates to means for securing floor boards and more particularly wooden floor boards or planks to a supporting structure of the steel beam type.

An object of the present invention is to provide an improved floor clip for securing floor boards to a supporting beam or sill.

Another object of the invention is to provide a clip which is simple in construction and at the same time provide a clip which effectively secures the floor boards to a supporting sill.

Another object of the invention is an improved method of constructing a clip of the above type from a bar of rolled metal stock.

Another object of the invention is the improved method of constructing a clip of the above type from predetermined lengths or widths of metal bars of the desired cross-sectional form which provides for a minimum amount of tooling when fabricating such lengths or widths into their final form.

Another object of the invention is the improved method of constructing a clip of the above type from predetermined lengths or widths of metal bars of the desired cross-sectional form which provides the clip fabricated from such lengths or widths with integral means for locking the nut which clamps the clip in securing position against rotation.

With these and other objects in view, the invention consists of novel details of construction and arrangement of parts as will be more fully hereinafter disclosed and particularly pointed out in the appended claims.

For a more complete understanding of the invention reference may be had to the accompanying drawing, in which several forms of the invention are illustrated, and in which.

Figure 1:
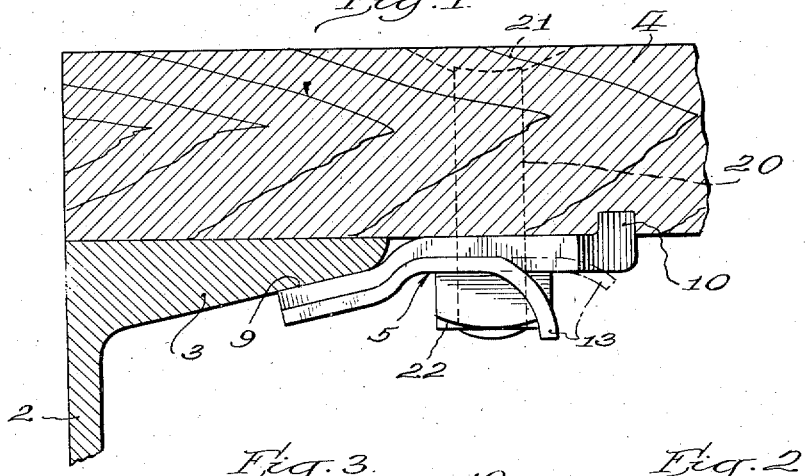
Fig. 1 is a fragmentary vertical section of a floor construction showing the application of one of the devices of the invention.
Figure 3:
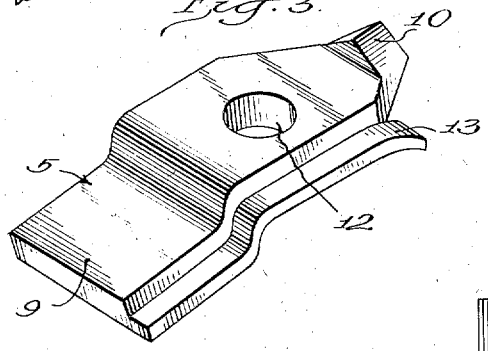
Fig. 3 is a perspective view of the clip associated with the floor construction of Fig. 1.
Figure 2:
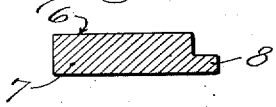
Fig. 2 is a transverse sectional view of the rolled metal bar from which one form of the device of the invention is fabricated.
Figure 4:
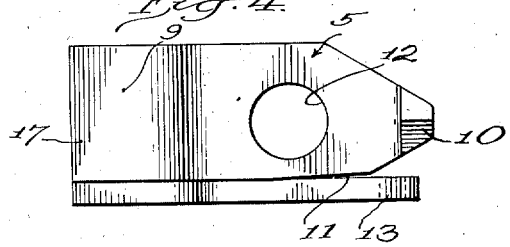
Fig. 4 is a top plan view of the clip illustrated in Fig. 3.
Figure 5:
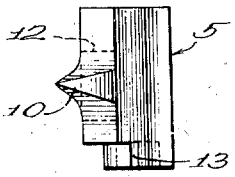
Fig. 5 is a right end elevation of Fig. 4.
Figure 6:
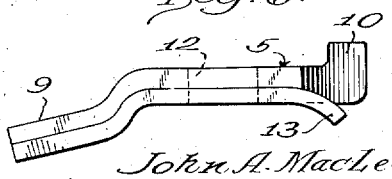
Fig. 6 is a side elevation of Fig. 4.

The present reissue application is one of two applications covering the subject-matter of the original patent, and this application relates particularly to the preferred embodiment of Figs. 1 to 6 of said patent and to the method of making floor clips. The co-pending application, Serial No. 370,429, filed December 16, 1940, relates to the subjects-matter of Figs. 7 to 15, inclusive, of the original patent.

Referring now to the drawing, and particularly to Figs. 1 to 6, inclusive, in which one form of the invention is illustrated, the reference character 2 indicates the side sill of a railway car, and which extends longitudinally thereof, and usually comprises an I beam or a U beam having a horizontally disposed upper sill flange 3. The sill 2 is adapted to support the floor boards extending across the car, one of which is indicated by the reference character 4 and secured thereto by means of a clip indicated generally by the reference character 5. The clip 5 is fabricated from a predetermined length of a rolled metal bar 6 of the form illustrated in transverse section in Fig. 2 and consists of a main body portion 7 of rectangular cross-section and a narrow integrally formed rib formation 8 extending laterally from a side of the same.

The clip 5 is fabricated from a predetermined length of the bar 6 by means of a suitable shearing and forming operation to provide the same with a frame engaging flange in the form of an offset portion 9 at one end thereof to position this portion 9 out of the plane of the body of the clip and at the proper angle so as to conform to the angle of the lower face of the sill flange 3 while the horizontal body of the clip 5 or attaching flange bears against the underside of the board 4. A toothed or prong formation 10 is formed at the forward end of the body of the clip by the shearing and forming operation and is bent upwardly at right angles to the body of the clip. This tooth or prong 10 is adapted to be forced into the underside of the floor board 4 when the clip is in securing position to prevent rotation of the clip. A portion of the rib formation adjacent the forward end of the clip is sheared from the body of the same as indicated at 11 in Fig. 4 to a point adjacent the axis of the bolt opening 12 in the clip and on a line of severance sufficiently spaced from said opening or aperture to leave a substantial unbroken reinforcing area between said line and said aperture. This sheared portion forms a wing member 13 having its free end in the general shape of a tongue arcuately formed and directed downwardly and provides means for locking the nut which secures the clip in fastening position against rotation, as will presently be described.

As illustrated in Fig. 1, the board 4 is provided with a bolt hole 20 adjacent the edge of the sill flange 3 and is adapted to receive the bolt 21 which extends therethrough. This bolt 21 in combination with the clip 5 secures the floor board 4 to the sill 2 against movement. The clip 5 as provided with the bolt opening 12 for the passage of the bolt 21 may now be placed on the same and positioned to permit the angularly disposed offset 9 to contact the lower face of the sill flange 3. A nut 22 may now be threaded on the bolt 21 and threaded home to force the tooth or prong 10 into the underside of the board 4 and place the horizontal body of the clip 5 in firm contact with the underside of the board 4 and in the plane of the upper face of the sill 2 which includes the sill flange 3. The wing 13 may now be bent down by engaging the downwardly directed forward portion of the same by a suitable tool from its position indicated in dotted lines in Fig. 1 to its locking position. When in locking position the wing 13 lies adjacent one side of the nut 22 as clearly illustrated in Fig. 1 and prevents rotation of same and by the use of the clip 5 the board 4 is firmly held in contact with the upper face of the sill 2, and the tooth or prong 10 thus embedded in the underside of the board 4 in turn prevents rotation of the clip when in fastening position. The wing 13 integral with the clip provides locking means for the nut 22 and prevents the same from working loose by reason of the fact that the wing 13 forms an integral part of the clip 5 and lies in close proximity to a face of the nut 22.

One of the most important characteristics of the floor clips embodying the preferred embodiment of the invention lies in the fact that the bolt locking members are so constructed that they are readily bendable in such a direction as to move into nut locking position, but these nut locking members are also adapted to withstand the turning movement of the nut with a maximum resistance.

Thus the nut locking flange 13 is made of such cross section, particularly at the point of bending, preferably only a small fraction of the cross section of the body of the clip taken on a transverse line at the base of the locking flange, that it can readily be bent downward from the dotted line position of Fig. 1 to the full line position because the bending takes place away from the face of the floor clip, and the nut locking flange is relatively thin at the point where the bending takes place.

The nut locking flange is, however, adapted to resist turning of the nut 22 by the edgewise engagement of the flange 13 and any bending of the flange in that direction would be transverse to the direction of bending of the nut locking flange which takes place during the movement from the dotted line position of Fig. 1 to the full line position. Thus the cross section of the nut locking flange is suitably weakened to facilitate the bending in such direction as to bring the flange into nut locking engagement with the nut, but its strength and rigidity are maintained in a transverse direction to resist turning of the nut.

While there has been illustrated and described the floor clip and its various modifications associated with a floor construction applicable to a railway car, it is to be understood that they are applicable for use in securing the boards of a floor in various constructions. Neither should the invention be limited to the exact structures as shown, as changes and modifications will readily suggest themselves, and it is desired to cover all such changes as come within the spirit and scope of the appended claims.

The invention is claimed as follows:

1. The method of making a fastening clip which consists in shearing a blank of predetermined length from a metal bar having a rectangular cross-section and a laterally extending rib and simultaneously forming said blank to provide the clip with a downwardly directed rib portion and upwardly extending prong and an offset portion angularly displaced with relation to the body of the clip.

2. The method of making a fastening clip which consists in shearing a blank of predetermined length from a metal bar having a body of rectangular cross-section and a laterally extending rib and simultaneously shearing and forming said blank to provide the clip with a downwardly directed tongue comprising a portion of said rib and an upwardly extending prong comprising the oppositely biased end of the section.

3. The method of making a fastening clip which consists in shearing a blank of predetermined length from a metal bar having a body of rectangular cross-section and a laterally extending rib and then simultaneously shearing and forming said blank to provide the clip with a downwardly directed tongue comprising a portion of said rib, an upwardly extending prong formed of the oppositely biased end of the section and an offset portion angularly displaced with relation to the body of the clip.

4. The method of forming floor clips for securing a floor to a structural member, comprising forming a metal member having a section of a thickness suitable for a floor clip and an integral section attached thereto of a lesser thickness suitable for a bendable nut lock, cutting said metal member into suitable lengths, forming apertures in said member for bolts, and turning up a portion of said section of lesser thickness into position to be utilized as a nut lock.

5. In a floor clip for securing floors to structural frame members, an integral metal member having an attaching flange provided with an aperture for receiving a securing bolt to secure said member, a frame engaging flange carried by said clip, an offset in said clip adjoining said attaching flange and frame engaging flange and bringing said frame engaging flange into a different plane, whereby the flooring may be located on one side of the frame and the clip may engage the opposite side of the frame, and an integral extension of said clip adapted to be bent up into engagement with a nut on the securing bolt for securing the nut in predetermined position by engagement with the flat surfaces on the nut, and integral pointed means carried by said clip for engaging in the floor and preventing rotation of said clip.

6. A floor clip for car flooring or the like, comprising an integral metal member having a supporting body forming an attaching flange and having a bolt aperture, said body having an offset and a frame engaging flange carried by said offset, and an integral extension of said body formed of lesser thickness and adapted to be bent, said extension being provided with a bendable part for engaging the nut of the securing bolt and securing said nut in predetermined position.

7. A floor clip for car flooring or the like, comprising an integral metal member having a supporting body forming an attaching flange and having a bolt aperture, said body having an offset and a frame engaging flange carried by said offset, and an integral extension of said body formed of lesser thickness and adapted to be bent, said extension being located along the side of said clip and having a cut between a part of said extension and the body of said clip, whereby the end of said extension forms a bendable lug located adjacent the aperture and adapted to be bent into engagement with the nut of a securing bolt to locate the nut in predetermined position.

8. In a floor clip for securing floors to structural frame members, an integral metal member having an attaching flange provided with an aperture for receiving a securing bolt to secure said member, a frame engaging flange carried by said clip, an offset in said clip adjoining said attaching flange and frame engaging flange and bringing said frame engaging flange into a different plane, whereby the flooring may be located on one side of the frame and the clip may engage the opposite side of the frame, and an integral extension of said clip adapted to be bent into engagement with a nut on the securing bolt for securing the nut in predetermined position by engagement with the flat surfaces on the nut, said integral extension having its cross-sectional area formed in such a manner as to facilitate bending of said extension into nut-locking engagement and to resist bending in a transverse direction by rotation of a nut engaged thereby.

9. In a floor clip for securing floors to structural frame members, an integral metal member having an attaching flange provided with an aperture for receiving a securing bolt to secure said member, a frame engaging flange carried by said clip, an offset in said clip adjoining said attaching flange and frame engaging flange and bringing said frame engaging flange into a different plane, whereby the flooring may be located on one side of the frame and the clip may engage the opposite side of the frame, and an integral extension of said clip adapted to be bent into engagement with a nut on the securing bolt for securing the nut in predetermined position by engagement with the flat surfaces on the nut, said integral extension extending outward from the plane of said clip for engagement with a nut and having a reduced cross-sectional area at the point of bending to facilitate its movement into nut-engaging position.

10. In a floor clip for securing floors to structural frame members, an integral metal member having an attaching flange provided with an aperture for receiving a securing bolt to secure said member, a frame engaging flange carried by said clip, an offset in said clip adjoining said attaching flange and frame engaging flange and bringing said frame engaging flange into a different plane, whereby the flooring may be located on one side of the frame and the clip may engage the opposite side of the frame, and an integral extension of said clip adapted to be bent into engagement with a nut on the securing bolt for securing the nut in predetermined position by engagement with the flat surfaces on the nut, said integral extension comprising a part extending from the plane of said clip and having a greater dimension in the direction of its resistance to the turning of the nut than its dimension in the direction of its bending into nut locking position and the cross-sectional area of said extension at the point of bending being only a small fraction of the cross-sectional area of the clip at the base of said extension on a line parallel to said offset.

11. In a floor clip for securing floors to structural frame members, an integral metal member having an attaching flange provided with an aperture for receiving a securing bolt to secure said member, a frame engaging flange carried by said clip, an offset in said clip adjoining said attaching flange and frame engaging flange and bringing said frame engaging flange into a different plane, whereby the flooring may be located on one side of the frame and the clip may engage the opposite side of the frame, and an integral extension of said clip adapted to be bent into engagement with a nut on the securing bolt for securing the nut in predetermined position by engagement with the flat surfaces on the nut, said integral extension initially extending from the plane of said clip and being located for edgewise engagement with the lateral surface of a nut to resist the turning movement of said nut most effectively.

12. In combination in a floor clip for securing together a sill and a floor board supported thereby, a body including a portion for engaging the underside of said board and another portion for engaging under the sill, one of said portions being constructed to receive fastening means for securing the clip to the sill and the floor board, and means integral with said clip for locking said fastening means, said integral means comprising a bendable tongue formed to extend at an angle to the major plane of the clip into locking engagement with said fastening means and having a cross-sectional area at least at the point where the tongue is normally adapted to be bent for movement into the locking engagement equal to only a small fraction of the cross-sectional area of the clip body at the base of the tongue whereby to reduce resistance to bending of the tongue into said locking engagement, as compared with the resistance to bending of the body in the same general direction.

13. In combination in a floor clip for securing together a sill and a floor board supported thereby, a body including a portion for engaging the underside of the board and another portion for engaging under the sill, one of said portions being constructed to receive fastening means for securing the clip to the sill and the floor board, and means integral with one of said portions for locking said fastening means, said integral means comprising a relatively flat tongue arranged to extend at an angle to its associated portion to present an edge area of said tongue for locking engagement with the fastening means.

14. In combination in a floor clip for securing together a sill and a floor board supported thereby, a body including a portion for engaging the underside of the board and another portion for engaging under the sill, one of said portions having an aperture to receive fastening means for securing the clip to the sill and to the floor board, and means integral with said body for locking said fastening means, said integral means being severed from the body along a line adjacent to and spaced from said aperture and having its severed edge disposed for engagement with said fastening means.

15. In combination in a floor clip for securing together a sill and a floor board supported thereby, a body including a portion for engaging the underside of the board and another portion for engaging under the sill, one of said portions having an aperture to receive fastening means for securing the clip to the sill and the floor board, and means in the form of a tongue integral with said body for locking said fastening means, said tongue being partially severed from the associated body portion in such a manner as to engage said fastening means edgewise, and the spacing of the line of severance of said tongue from said aperture leaving a substantial unbroken reinforcing area between the line of severance and said aperture.

16. In a floor clip for securing floors to structural frame members, a body formed from metal substantially resistant to distorting forces while in use and including a frame flange and a floor engaging flange, an offset in said body connecting said flanges in different planes so that the frame engaging flange is adapted to engage the underside of a frame member which supports a floor member on the upper side thereof, one of said flanges having an aperture to receive a securing bolt assembly extending down from the floor member to attach the clip to the floor member and thereby secure the floor member to the frame member, and a generally flat portion on one of said flanges adapted to be bent into locking engagement with a laterally facing surface on a part of the securing bolt assembly to hold such part against rotation, said locking portion having a cross-sectional area at the point of bending equal to only a small fraction of the cross-sectional area of the body at the base of said portion so that said portion can easily be bent into said locking engagement but is of sufficient proportions to resist bending out of said locking engagement under the influence of pressure exerted by said engaged part.

17. A floor clip of the character described for securing floor and structural frame members together comprising, in combination, a metal body including a flange for engaging the underside of the frame member and a flange for engaging the underside of the floor member, an offset in said body connecting said flanges in different planes so as to accommodate the different planes of the engaged frame and floor surfaces, one of said flanges having an aperture to receive a securing bolt assembly extending down from the floor to attach the clip to the floor and thereby secure the floor to the frame element, and a generally flat portion of one of said flanges adapted to be bent into locking engagement at one of its edges with a laterally facing surface on a part of the securing bolt assembly whereby to hold such part of the securing bolt assembly against rotation.

18. In a floor clip for securing floors to structural frame members, a relatively heavy metal body including a frame engaging flange and a floor engaging flange, an offset in said body connecting said flanges in different planes so that the frame engaging flange is adapted to engage the underside of a frame member which supports a floor member on the upper side thereof, one of said flanges having an aperture for receiving the shank of a securing bolt assembly extending down from the floor member to attach the clip to the floor member and thereby secure the floor member to the frame member, and an integral portion severed along a line adjacent to said aperture from one of said flanges and adapted to be bent to drive a severed edge area of the portion into locking engagement with a laterally facing surface of a part of the securing bolt assembly to hold such part of the bolt assembly against rotation, said integral portion being of a cross-sectional structure relative to the body to facilitate bending of the portion into locking engagement but to resist bending out of locking engagement by force exerted by said engaged part of the securing bolt assembly under ordinary conditions in use tending to rotate the latter.

MACLEAN-FOGG LOCK NUT COMPANY,
*Assignee of John A. MacLean, Deceased,*
By JOHN A. MACLEAN, JR.,
*President.*